(12) United States Patent
Barakat et al.

(10) Patent No.: US 8,032,433 B1
(45) Date of Patent: Oct. 4, 2011

(54) SHARI'AH COMPLIANT PRIVATE EQUITY INVESTMENT SYSTEM

(75) Inventors: Nadim M Barakat, New York, NY (US); David M Russell, Cooperstown, NY (US); Edward Nadel, New York, NY (US); John Opar, New York, NY (US); Nizam M. S. Yaguby, Manama (BH)

(73) Assignee: Credit Suisse Securities (USA) LLC, New York, NY (US)

( * ) Notice: Subject to any disclaimer, the term of this patent is extended or adjusted under 35 U.S.C. 154(b) by 1098 days.

(21) Appl. No.: 11/096,928

(22) Filed: Apr. 1, 2005

Related U.S. Application Data

(60) Provisional application No. 60/626,052, filed on Nov. 8, 2004.

(51) Int. Cl.
*G06Q 40/00* (2006.01)
(52) U.S. Cl. ........................ 705/35; 705/36 T
(58) Field of Classification Search ............... None
See application file for complete search history.

(56) References Cited

U.S. PATENT DOCUMENTS

| | | | | |
|---|---|---|---|---|
| 5,812,987 | A * | 9/1998 | Luskin et al. ............... | 705/36 R |
| 6,578,016 | B1 * | 6/2003 | Trankina et al. ............. | 705/36 T |
| 7,149,712 | B2 | 12/2006 | Lang ................... | 705/35 |
| 7,295,987 | B2 | 11/2007 | Graff ............................ | 705/313 |
| 7,516,099 | B2 | 4/2009 | Schneider ....................... | 705/38 |
| 7,702,550 | B2 | 4/2010 | Perg et al. ....................... | 705/35 |
| 2002/0077949 | A1 | 6/2002 | Qasem et al. .................. | 705/36 |
| 2002/0156725 | A1 | 10/2002 | Harara ............................. | 705/39 |
| 2003/0229555 | A1 | 12/2003 | Marlowe-Noren ............. | 705/35 |
| 2004/0148249 | A1 | 7/2004 | Kinnear .......................... | 705/37 |
| 2004/0177029 | A1 | 9/2004 | Hammour et al. .............. | 705/38 |
| 2004/0205020 | A1 | 10/2004 | Halawi ............................ | 705/38 |
| 2004/0225589 | A1 | 11/2004 | Marlowe-Noren ............. | 705/35 |
| 2005/0075959 | A1 * | 4/2005 | Woodruff et al. ............... | 705/35 |
| 2005/0114151 | A1 * | 5/2005 | Graff ................................ | 705/1 |
| 2005/0222927 | A1 * | 10/2005 | Woodley ........................ | 705/35 |
| 2006/0136231 | A1 * | 6/2006 | Thomas ........................... | 705/1 |

OTHER PUBLICATIONS

Robert Fugard and Olga Petrovic, from Linklaters, "Think Islamic", Airfinance Journal. Coggeshall: Sep. 2004. p. 1-5.*
Richard De Belder, "Middle East: An overview of project finance and Islamic finance", International Financial Law Review. London: Jul. 1999. p. 1-6.*
Balasundram Maniam, "Perception of Islamic financial system: Its obstacles in application, and its market", Academy of Accounting and Financial Studies Journal. Cullowhee: May 2000. vol. 4, Iss. 2; p. 1-8.*
Noriba Bank, "Innovation in Islamic banking", Euromoney. Jan. 2004, v 35, n 417, p. 1-2.*
Islamic Banks: A Novelty No Longer, Bloomberg Businessweek, Aug. 8, 2005, 2-pages.*

(Continued)

*Primary Examiner* — Gregory Johnson
(74) *Attorney, Agent, or Firm* — King & Spalding

(57) ABSTRACT

Methods and systems are provided whereby an Islamic investor (106) transfers a commodity to a corporate investor (108) in exchange for a contract to repay the value of the commodity plus a target rate of return in accordance with and agreed-upon schedule (204). The corporate investor in turn converts the commodity to a liquid asset for investment in an investment fund (206). The returns from the investment fund are used to satisfy the contract with the Islamic investor (214). The investment is thus made in accordance with Shari'ah law.

12 Claims, 2 Drawing Sheets

OTHER PUBLICATIONS

Figure 1:
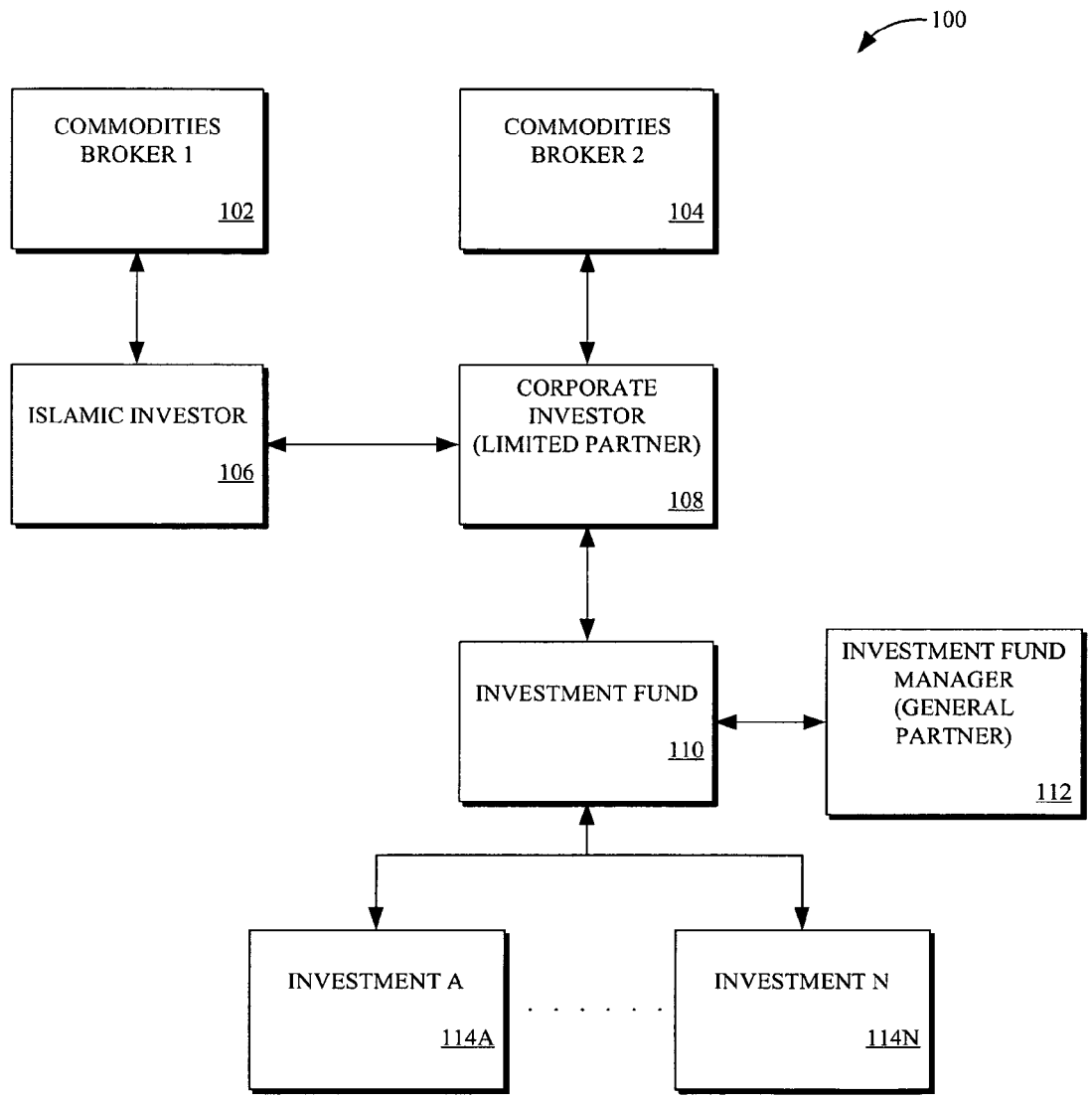

An Overview of Shariah-Compliant Funds, QFINANCE, date=unknown, 3-pages.*

Shariah-compliant funds: A whole new world of investment, PriceWaterhouseCoopers, 2009, 14-pages.*

Islamic banking, wikipedia, 2-pages.*

The changing face of Islamic banking; De Belder, Richard T, Khan, Mansoor Hassan; International Financial Law Review. London; Nov. 1993. vol. 12, Iss. 11; 5-pages.*

Faith in the system; Giles Parkinson; Intheblack; Aug. 2007; 4-pages.*

Unlocking Islamic Finance, Part 1; Khalili, Sara; Infrastructure Finance; Apr. 1997; 4 pages.*

Robert Fugard and Olga Petrovic, from Linklaters, "Think Islamic", Airfinance Journal. Coggeshall: Sep. 2004. pp. 1-5.*

Richard De Belder, "Middle East: An overview of project finance and Islamic finance", International Financial Law Review. London: Jul. 1999. p. 1-6.*

Balasundram Maniam, "Perception of Islamic financial system: Its obstacles in application, and its market", Academy of Accounting and Financial Studies Journal. Cullowhee: May 2000. vol. 4, Iss. 2; pp. 1-8.*

Noriba Bank, "Innovation in Islamic banking", Euromoney. Jan. 2004, v 35 , n 417 , p. 1-2.*

* cited by examiner

SHARI'AH COMPLIANT PRIVATE EQUITY INVESTMENT SYSTEM

RELATED APPLICATIONS

This application claims the benefit of U.S. provisional application Ser. No. 60/626,052 filed Nov. 8, 2004 by Barakat, Nadim M., et al., titled: SHARI'AH COMPLIANT PRIVATE EQUITY INVESTMENT SYSTEM.

FIELD OF THE INVENTION

The present invention relates generally to methods and systems for managing financial investments and more particularly to managing private equity investments in a manner compliant with Shari'ah law.

SUMMARY OF THE INVENTION

Islamic religious law, more particularly Shari'ah, dictates stringent requirements for financial investing.

Numerous efforts have been made to develop financial services compliant with Shari'ah. For example, each individual investment may be scrutinized to determine its compliance with Islamic law. If the investment is not compliant, it is rejected and other compliant investments are identified. Further, numerous structures have been developed whereby investors do not directly own or control their investments.

It would be desirable to develop methods and systems which enable Shari'ah followers to easily make investments while maintaining compliance with religious law.

SUMMARY OF THE INVENTION

In accordance with one embodiment of the present invention, there is provided a method of facilitating private equity investments in compliance with Shari'ah laws, comprising: receiving a transfer of ownership of a commodity from an investor in exchange for a first contract to repay the value of the commodity plus a target rate of return in accordance with a schedule; exchanging the commodity for a liquid asset; investing the liquid asset in investment fund; receiving a return on investment from the investment fund; and, satisfying the first contract with the investor from the returns of the investment fund.

In accordance with another embodiment of the invention, there is provided a method of facilitating investments in compliance with Shari'ah laws, comprising: receiving a transfer of ownership of a first asset from an investor in exchange for a first contract to repay the value of the first asset plus a target rate of return in accordance with a schedule; exchanging the first asset for a second asset; investing the second asset in an investment fund; receiving a return on investment from the investment fund; and satisfying the first contract with the investor from the returns of the investment fund.

The first asset may comprise a commodity. The second asset may comprise a liquid asset. The step of satisfying the first contract may comprise transferring a liquid asset to the investor.

The invention may further include the step of, where the return on investment from the investment fund exceeds the target rate of return, transferring additional funds to the investor in a manner consistent with Shari'ah law. The step of transferring additional funds to the investor may include the steps of: receiving a transfer of ownership of a third asset from the investor in exchange for a second contract to repay the value of the third asset plus an additional payment to the investor; and satisfying the second contract with the additional funds.

DESCRIPTION OF THE DRAWING FIGURES

Figure 2:
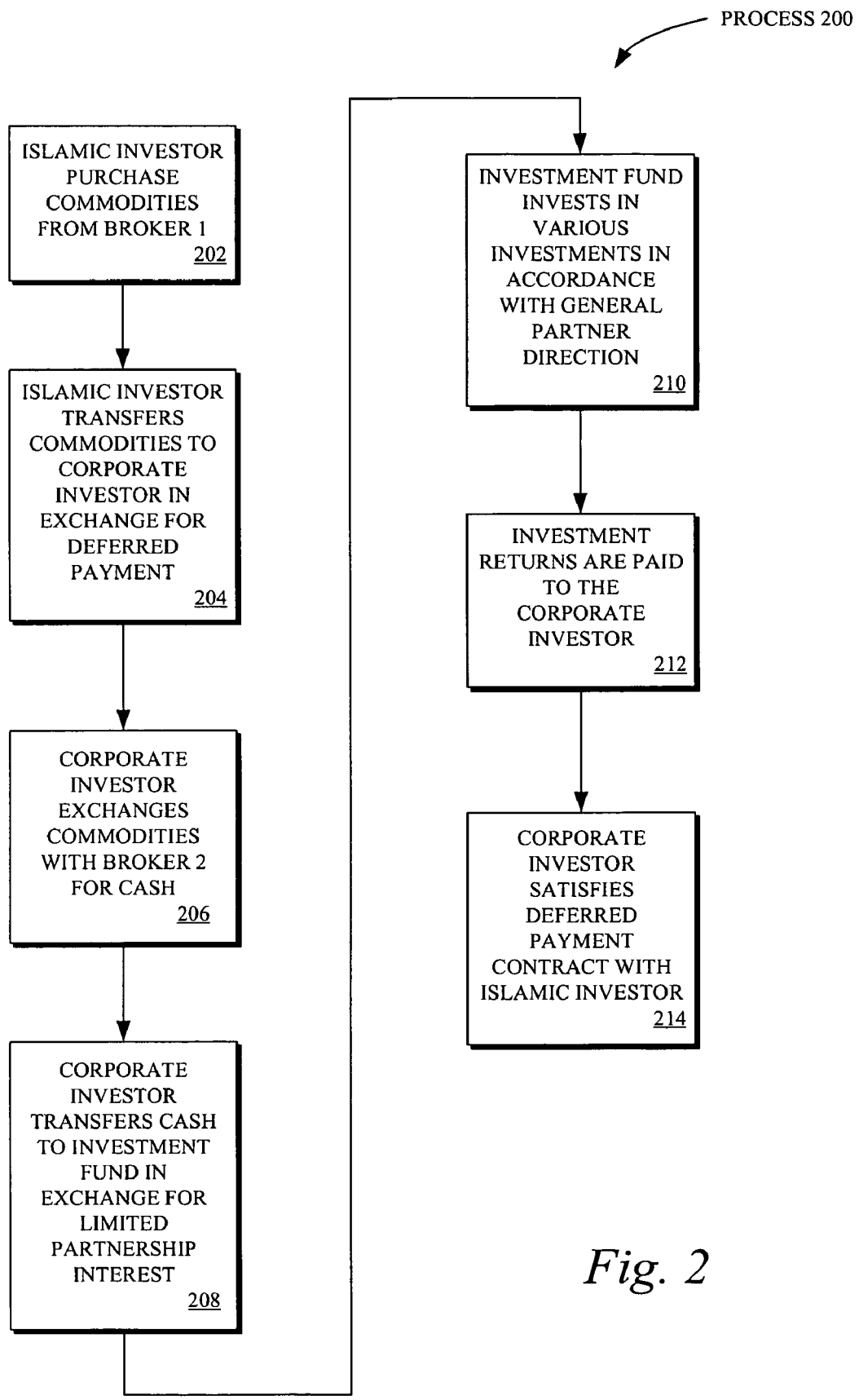

These and other objects, features and advantages of the invention will now be apparent to the reader through a consideration of the Detailed Description of the Invention when read in combination with the drawing Figures in which:

FIG. 1 is a block diagram illustrating the various parties participating in a Shari'ah compliant equity investment program in accordance with the present invention; and FIG. 2 is a flow chart illustrating a process for operating an investment program in accordance with the present invention.

DETAILED DESCRIPTION OF THE INVENTION

With reference now to FIG. 1 there is shown a system 100 including a Shari-ah compliant Islamic investor 106 communicating with a commodities broker 102. Investor 106 further communicates with a corporate investor 108, the corporate investor in turn communicating with a second commodities broker 104 and investment fund 110. Investment fund 110 is managed by an investment fund manager 112, and in turn invests in a variety of equity investments, indicated at 114A and 114N.

Investor 106 comprises a private investor. Commodities brokers 102 and 104 comprise conventional commodities brokers, and may in one embodiment of the invention comprise a single brokerage. Corporate investor 108 comprises a conventional corporation established in accordance with the laws of a selected state or country, and is a limited partner in investment fund 110. Investment fund 110 comprises a conventional private equity investment fund established, for example, by a financial services provider. Investment fund manager 112 comprises a general partner, and manager, of investment fund 110. Investments 114A, 114N comprise a series of conventional private equity investments, the number and magnitude of which are determined by investment fund manager 112.

With reference now to FIG. 2, there is shown a process 200 by which a Shari'ah compliant investor can invest in private equities while in compliance with Islamic law. Initially, investor 106 purchases a desired value of a first asset such as conventional commodities from broker 1 (step 202), the value dependent on how much the investor desires to invest in equities.

Investor 106 then transfers ownership of the commodities, for example through a transfer of a conventional commodity contract, to corporate investor 108, in exchange for a deferred payment contract (step 204). In one embodiment of the present invention, the deferred payment contract comprises an agreement to pay back the principal value of the transferred commodity plus a target rate of return in accordance with an agreed-upon schedule. It will be understood that, in the described embodiment of the invention, the deferred contract includes a target rate of return, with risks such as the risk of receiving less than the targeted rate of return and/or the risk of loss of principal accepted by the investor 106.

Corporate investor 108 sells the commodities transferred to them from investor 106, for example to broker 2, for a second asset, preferably a liquid asset, such as cash (step 206). Corporate investor 108 than transfers the cash realized from the sale of the commodities to investment fund 110 (step 208). It will be understood that corporate investor 108 either has a pre-existing agreement with investment fund 110, or establishes same upon the first investment, whereby the corporate investor is a limited partner in the investment fund. Conventional agreements are established between corporate investor 108 and investment fund 110, in accordance with typical investments in private equity investment funds.

As noted above, investment fund manager 112 is established as a general partner and manager of investment fund 110. The investment fund 110 is managed, by fund manager 112, who in turn initiates and manages a series of private equity investments, indicated at 114A through 114N (step 210). Returns recognized by investment fund 110 are paid to corporate investor 108 in accordance with the pre-established investment agreement (step 212). The returns paid by investment fund 110 to corporate investor 108 are used to satisfy the terms of the deferred-payment contract established with investor 106 (step 214). That is, the principal and target rate of return are paid by corporate investor 108 to Islamic investor 106 in accordance with their pre-established, deferred-payment agreement. It will be understood that, in contrast to the initial transfer of commodities from investor 106 to corporate investor 108, the repayment of the monies paid by the corporate investor to the Islamic investor may be paid in cash, while maintaining compliance with Shari'ah.

As noted above, the contract established between corporate investor 108 and Islamic investor 106 provides for a target rate of return, not a guaranteed rate of return. Thus, if the returns recognized by investment fund 110 are less than the returns targeted in the agreement between the Islamic investor 106 and corporate investor 108, then the lesser amount may be paid by corporate investor 108 to Islamic investor 106.

If a greater return than the targeted rate of return is recognized by investment fund 110, then appropriate arrangements are made to pay that higher return from corporate investor 108 to Islamic investor 106. More particularly, to maintain compliance with Shari'ah laws, a subset of the above process is repeated, whereby i) the Islamic investor 106 purchases an asset such as commodities from broker 1 (step 202), ii) the Islamic investor transfers the commodities to corporate investor 108 in exchange for a deferred payment contract (step 204), and iii) the corporate investor 108 satisfies the deferred payment contract (step 214) in a relatively short period of time and without necessarily investing these last-received funds in investment fund 110. In this manner, the unexpectedly high returns recognized by investment fund 110 can be paid to Islamic investor 106, while maintaining compliance with Shari'ah laws.

While not strictly required by the Shari'ah laws, in accordance with one embodiment of the invention, investment fund 110 uses reasonable care to ensure that the investments 114A through 114N are in permissible industries for Shari'ah investors.

It will be appreciated that one or more of the various steps described above may be performed on an appropriately configured computer system. For example, and without limitation, the operations performed by investment fund 110 are typically performed in whole or in part on a computing system.

There are thus provided new and improved methods and systems for enabling followers of Islamic Shari'ah laws to invest. The process is relatively simple for the Islamic investor, requiring only the purchase and transfer of commodities in a conventional manner. The commodities are received by a corporate investor, liquidated, and the liquid assets invested in a fund managed to generate the targeted rate of return. Returns from the investments are transferred back to the Islamic investor from the fund through the corporate investor. The invention has application in the field of financial services.

While the invention has been described with respect to particular embodiments, it is not thus limited. Numerous changes, modifications and improvements within the scope of the invention will now be apparent to the reader.

What is claimed is:

1. A computer implemented method of facilitating investments, comprising:

receiving a transfer of ownership of a first asset having a value from an investor in exchange for a first contract to repay the value of the first asset plus a target rate of return in accordance with a schedule;

exchanging the first asset for a second asset;

investing the second asset in an investment fund, the investing step performed by a computer that invests the second asset in the investment fund;

receiving at least one return on investment from the investment fund, the receiving step performed by the computer that receives the return on investment from the investment fund;

satisfying the first contract with the investor from the at least one return of the investment fund;

determining, by the computer, that the at least one return on investment from the investment fund exceeds the target rate of return; and transferring additional funds to the investor, wherein the transferring of additional funds is accomplished via a second contract.

2. The method of claim 1, wherein the first asset comprises a commodity.

3. The method of claim 1, wherein the second asset comprises a liquid asset.

4. The method of claim 3, wherein the step of the satisfying the first contract includes transferring the liquid asset to the investor.

5. The method of claim 1, wherein the step of transferring additional funds to the investor includes the steps of:

receiving a transfer of ownership of a third asset from the investor in exchange for the second contract, wherein the second contract comprises a contract to repay the value of the third asset plus an additional payment to the investor; and satisfying the second contract with the additional funds.

6. A system for facilitating investments, comprising:

a processor;

a memory connected to the processor and storing instructions to control the operation of the processor to perform the steps of receiving a transfer of ownership of a first asset from an investor in exchange for a first contract to repay the value of the first asset plus a target rate of return in accordance with a schedule;

exchanging the first asset for a second asset;

investing the second asset in an investment fund;

receiving at least one return on investment from the investment fund;

satisfying the first contract with the investor from the at least one return of the investment fund;

determining that the return on investment from the investment fund is higher than the target rate of return; and transferring additional funds equal to the higher return to the investor, wherein the transferring of additional funds is accomplished via a second contract.

7. A computer implemented method for facilitating private equity investments, comprising:
- receiving a transfer of ownership of a commodity from an investor in exchange for a first contract to repay the value of the commodity plus a target rate of return in accordance with a schedule;
- exchanging the commodity for a liquid asset;
- investing the liquid asset in an investment fund, the investing step performed by a computer that invests the second asset in the investment fund;
- receiving a return on investment from the investment fund, the receiving step performed by the computer that receives the return on investment from the investment fund;
- satisfying the first contract with the investor from the return of the investment fund;
- determining, by the computer, that the return on investment from the investment fund exceeds the target rate of return;
- receiving a transfer of ownership of a third asset from the investor in exchange for a second contract to repay the value of the third asset plus an additional payment to the investor; and
- satisfying the second contract with additional funds, wherein the additional funds are based on the difference between the return on investment from the investment fund and the target rate of return.

8. A computer program product having stored therein a set of instructions that when executed cause a computer to implement a process for facilitating private equity investments, which process comprises the steps of:
- receiving a transfer of ownership of a commodity from an investor in exchange for a first contract to repay the value of the commodity plus a target rate of return in accordance with a schedule;
- exchanging the commodity for a liquid asset;
- investing the liquid asset in an investment fund;
- receiving return on investment from the investment fund;
- satisfying the first contract with the investor from the return of the investment fund;
- determining that the return on investment from the investment fund exceeds the target rate of return;
- receiving a transfer of ownership of a third asset from the investor in exchange for a second contract to repay the value of the third asset plus an additional payment to the investor; and
- satisfying the second contract with additional funds, wherein the additional funds are based on the difference between the return on investment from the investment fund and the target rate of return.

9. The computer program product of claim 8, wherein the first asset comprises a commodity and the second asset comprises a liquid asset.

10. The system of claim 6, wherein the memory further stores instructions to control the operation of the processor to perform the step of transferring additional funds to the investor by storing instructions to control the operation of the processor to perform the steps of:
- receiving a transfer of ownership of a third asset from the investor in exchange for the second contract, wherein the second contract comprises a contract to repay the value of the third asset plus an additional payment to the investor; and
- satisfying the second contract with the additional funds.

11. The method of claim 7, wherein the first asset comprises a commodity and the second asset comprises a liquid asset.

12. The system of claim 6, wherein the first asset comprises a commodity and the second asset comprises a liquid asset.

* * * * *